United States Patent
Kuwayama et al.

[11] Patent Number: 5,874,793
[45] Date of Patent: Feb. 23, 1999

[54] HIGH SPEED ROTOR ASSEMBLY

[75] Inventors: Yoichi Kuwayama; Hiroyuki Izume; Naoyuki Jinbo; Kazushige Ohno, all of Ibi-gun, Japan

[73] Assignees: Ibiden Co., Ltd., Ogaki; Fuji Xerox Co., Ltd., Tokyo, both of Japan

[21] Appl. No.: 793,003

[22] PCT Filed: Jun. 2, 1995

[86] PCT No.: PCT/JP95/01078

§ 371 Date: Apr. 23, 1997

§ 102(e) Date: Apr. 23, 1997

[87] PCT Pub. No.: WO96/38679

PCT Pub. Date: Dec. 5, 1996

[51] Int. Cl.⁶ .............................. H02K 7/09; F16C 32/06
[52] U.S. Cl. ..................... 310/90.5; 310/90; 384/100
[58] Field of Search ..................... 310/67 R, 90, 310/90.5, 262; 384/90, 100, 114

[56] References Cited

U.S. PATENT DOCUMENTS

| | | | |
|---|---|---|---|
| 3,845,997 | 11/1974 | Boden et al. | 310/90.5 |
| 4,896,065 | 1/1990 | Tsuyama | 310/90 |
| 5,019,738 | 5/1991 | Weilbach et al. | 310/90.5 |
| 5,036,235 | 7/1991 | Kleckner | 310/90.5 |
| 5,240,332 | 8/1993 | Onishi et al. | 384/100 |
| 5,381,456 | 1/1995 | Vetter et al. | 384/100 |
| 5,407,281 | 4/1995 | Chen | 384/114 |
| 5,448,121 | 9/1995 | Tada | 310/90.5 |
| 5,675,200 | 10/1997 | Hayashi | 310/90 |
| 5,675,201 | 10/1997 | Komura et al. | 310/90.5 |

FOREIGN PATENT DOCUMENTS

| | | |
|---|---|---|
| 59-23319 | 2/1984 | Japan . |
| 61-269115 | 11/1986 | Japan . |
| 63-70532 | 5/1988 | Japan . |
| 2-304514 | 12/1990 | Japan . |
| 4-118763 | 10/1992 | Japan . |

*Primary Examiner*—Clayton E. LaBalle
*Attorney, Agent, or Firm*—Pillsbury Madison & Sutro LLP

[57] ABSTRACT

A ring-shaped magnet (19) is bonded on or secured to the outer peripheral side of a rotor (21) which is borne by a rotary shaft (13) which constitutes a radial pneumatic dynamic pressure bearing. A ring-shaped magnet (23) is disposed so that it is spaced at a given distance from the ring-shaped magnet (19). The rotor (21) is restricted from moving in the axial direction and is rotatably supported in the radial direction by the magnetic attracting forces of two ring-shaped magnets (19, 23). The rotor (21) is eccentric by 0.5 relative to the axis of rotation by the difference in magnetic balance between the ring-shaped magnets (19, 23). Accordingly, the radial pneumatic dynamic pressure bearing generates a high dynamic pressure. The herringbone pneumatic dynamic pressure generating grooves (15a, 15b) generate a high dynamic pressure. They provide a very high radial load bearing ability to enhance the accuracy of rotation.

13 Claims, 6 Drawing Sheets

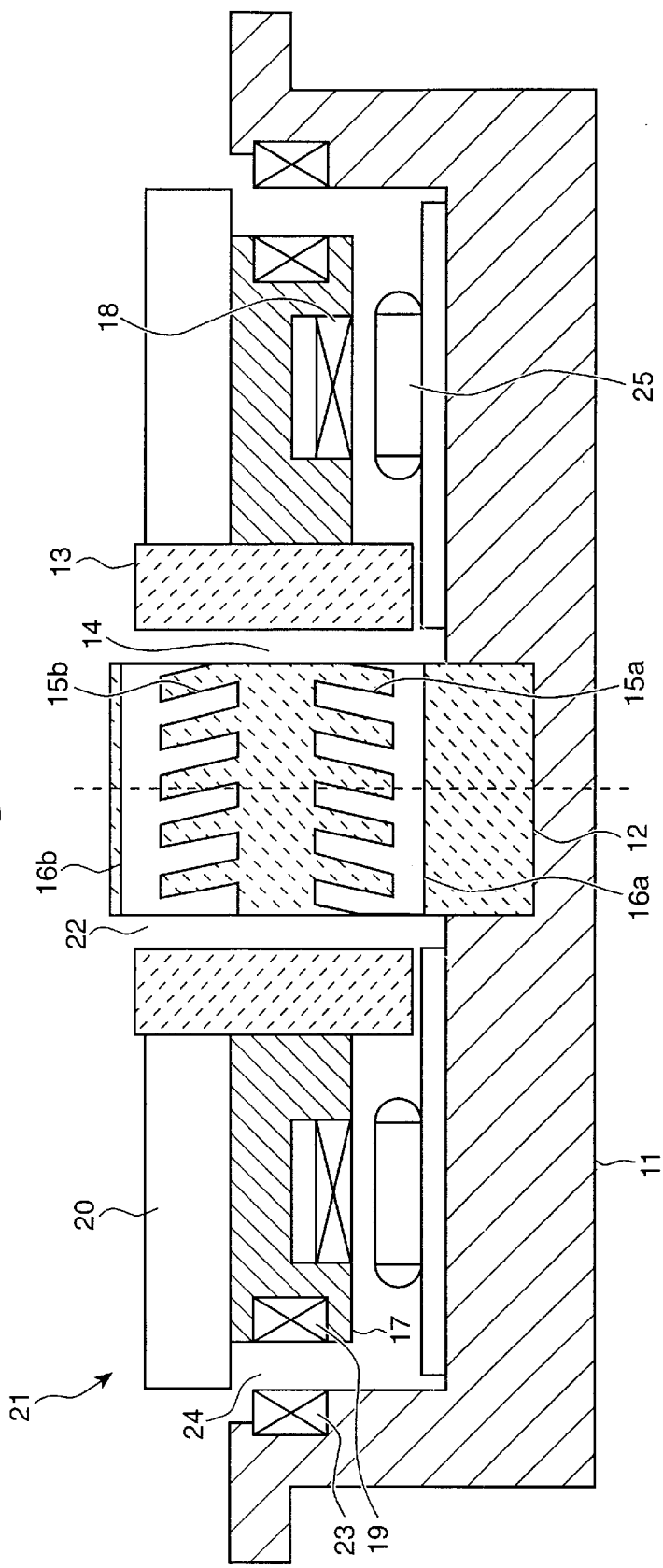

Fig. 7

| ECCENTRICITY | RADIAL CLEARANCE Cr (mm) | NUMBER OF ROTATION N (rpm) | BEARING NUMBER Λ | STABILITY CHARACTERISTICS Ω | STABILITY LIMIT WEIGHT M (kg) |
|---|---|---|---|---|---|
| 0.1 | 0.0020 | 8000 | 6.75 | 0.020 | 0.0102 |
| 0.1 | 0.0025 | 8000 | 4.32 | 0.020 | 0.0081 |
| 0.1 | 0.0030 | 8000 | 3.00 | 0.020 | 0.0068 |
| 0.2 | 0.0020 | 8000 | 6.75 | 0.082 | 0.0417 |
| 0.2 | 0.0025 | 8000 | 4.32 | 0.081 | 0.0330 |
| 0.2 | 0.0030 | 8000 | 3.00 | 0.079 | 0.0268 |
| 0.3 | 0.0020 | 8000 | 6.75 | 0.223 | 0.1133 |
| 0.3 | 0.0025 | 8000 | 4.32 | 0.217 | 0.0885 |
| 0.3 | 0.0030 | 8000 | 3.00 | 0.200 | 0.0678 |
| 0.4 | 0.0020 | 8000 | 6.75 | 0.380 | 0.1933 |
| 0.4 | 0.0025 | 8000 | 4.32 | 0.380 | 0.1546 |
| 0.4 | 0.0030 | 8000 | 3.00 | 0.380 | 0.1289 |
| 0.5 | 0.0020 | 8000 | 6.75 | 0.700 | 0.3560 |
| 0.5 | 0.0025 | 8000 | 4.32 | 0.700 | 0.2848 |
| 0.5 | 0.0030 | 8000 | 3.00 | 0.700 | 0.2374 |
| 0.6 | 0.0020 | 8000 | 6.75 | 1.100 | 0.5595 |
| 0.6 | 0.0025 | 8000 | 4.32 | 1.100 | 0.4476 |
| 0.6 | 0.0030 | 8000 | 3.00 | 1.050 | 0.3560 |
| 0.7 | 0.0020 | 8000 | 6.75 | 1.667 | 0.8477 |
| 0.7 | 0.0025 | 8000 | 4.32 | 1.667 | 0.6782 |
| 0.7 | 0.0030 | 8000 | 3.00 | 1.667 | 0.5651 |
| 0.8 | 0.0020 | 8000 | 6.75 | 2.400 | 1.2207 |
| 0.8 | 0.0025 | 8000 | 4.32 | 2.400 | 0.9766 |
| 0.8 | 0.0030 | 8000 | 3.00 | 2.400 | 0.8138 |

HIGH SPEED ROTOR ASSEMBLY

This application is the national phase of international application PCT/JP95/01078, filed Jun. 2, 1995 which designated the U.S.

BACKGROUND OF THE INVENTION

1. FIELD OF INVENTION

The present invention relates to a high speed rotor assembly that is strongly required to stably rotate at a high accuracy, such as rotary bearing for polygon mirror.

2. RELATED ART

Polygon mirrors are used in, for example, laser printers, bar code readers, facsimiles and laser copy machines. Since the efficiency of the polygon mirror is enhanced as the number of rotations increases, the number of rotations of 20000 r.p.m. or more has been preferred. As the bearing for such a high speed rotor assembly, for example, precise ball bearings have heretofore been used. However, it is difficult to keep a stable accuracy of rotation for an extended period of time due to such problems as wearing and that the limit of the rotational speed is about 16000 r.p.m.

Accordingly, grooved pneumatic dynamic pressure bearings for bearing a rotor rotating at a high speed have been used. The grooved pneumatic dynamic pressure bearings have features of low noise and low friction loss since they bear a rotor via a gas film in a non-contacting manner. However, they are weak for external shocks and vibrations of the rotor are may occur since the load bearing ability of the bearing is low. Thus it is difficult to obtain a stable accuracy of rotation.

In order to overcome the above-mentioned problems, there has been proposed, inter alia, a high speed rotor assembly in which the bearing rigidity is increased to suppress the vibration of the rotor 52 by enlarging the bearing 51 as disclosed in Japanese Unexamined Patent Publication No. Tokkai Sho 60-98213 and shown in the sectional view of FIG. 8. Another proposed solution has been a high speed rotor assembly, as disclosed in Japanese Unexamined Patent Publication No. Tokkai Sho 63-266420 and as shown in the section view of FIG. 9, in which: thrust direction pneumatic dynamic pressure bearings 62a and 62b are provided at opposite ends of the radial pneumatic dynamic pressure bearing 61 to suppress the vibrations of the rotor 63 by the pneumatic dynamic pressure generated in a thrust direction; and the size of a rotary shaft 61 is reduced.

In these high speed rotor assemblies which use axially long pneumatic dynamic pressure bearing having an increased radial rigidity for bearing the rotor, the rotor is larger than the rotor in the high speed rotor assembly using conventional ball bearings, thereby resulting in an increase in the size of the assemblies. One the other hand, the pneumatic dynamic pressure bearings generally require precise machining in which the accuracy of shape such as degree of cylindricality, roundness and surface roughness should be in the order of 1 μm to provide excellent accuracy of rotation. Therefore, the fact that the rotary shaft is long in an axial direction makes it difficult to perform machining. Although it is possible to perform machining, the manufacturing cost is so high that it is impractical.

Since the area of contact between the rotor and the thrust bearing surface is large in the rotor assembly in which the radial pneumatic dynamic pressure bearing is provided at both ends thereof with the thrust dynamic pressure bearings, a high starting torque is required for starting the rotor. As a result ringing effect (adsorption effect on the smooth face) mayoccur on the thrust bearing face which may prevent activation of the rotor assembly.

When the inner peripheral side of a cylindrical work piece is machined, the inner diameter at opposite ends tends be less or higher than that at the midposition thereof. In other words, the inner peripheral side of the work piece may be machined into arcuate shape as shown in FIGS. 2A and 2B. Therefore, unstable dynamic pressure distribution is liable to occur at the both ends of the radial bearing due to the changes in the gap of the bearing and the resulting changes in the number of rotations. Vibrations in a conical mode may occur due to occurrence of unforeseen vibrations, amplification of the vibrations, of the rotor at a specific vibration frequency of synchronized vibration and resonation of the vibration with the magnetic force balance in a thrust direction. As a result, the bearing of the rotor may contact with the stationary shaft and the vibrations due to shock may not be dumped.

Therefore, the present invention was made in order to overcome the above-mentioned problems. It is an object of the present invention to provide a high speed rotor assembly which is compact in size; requires a less starting torque; and provides a superior stable accuracy of rotation in a wide range from the beginning of rotation to a high speed rotation to a high shock environment.

SUMMARY OF THE INVENTION

Means for Accomplishing the Above Mentioned Object

According to an aspect of the present invention, there is provided a high speed rotor assembly including:

- a radial direction pneumatic dynamic pressure bearing having a housing, a stationary shaft which erects on and within said housing and a rotary shaft surrounding said stationary shaft, which is rotatably borne; and
- a magnetic bearing having a rotor which is secured to said rotary shaft and which is provided along its outer peripheral side with a magnetized portion, a ring-shaped magnet secured to said housing, which is positioned in-the same plane as said magnetized portion for bearing said rotor in a radial and thrust directions so that a gap is formed between said rotary and stationary shafts in a radial direction, characterized in that the radial load of said rotor is borne by the combination of the load bearing ability of said radial pneumatic dynamic pressure bearing and the radial load bearing ability of said magnetic bearing and in that said rotor is borne at an eccentricity of 0.3 to 0.7. A term "eccentricity" used herein is defined as the offset of the center of the rotor from the center of the radial bearing/the gap of radial bearing.

The load bearing ability of said radial pneumatic dynamic pressure bearing for bearing said rotor may be larger than the radial load bearing ability of said magnetic bearing in a range of applicable numbers of rotations of said rotor (3000–40000 r.p.m.).

The bearing surfaces of said stationary and rotary shafts in said radial pneumatic bearing may be formed into smooth surfaces.

Said stationary shaft of said radial pneumatic bearing may be formed on the bearing surface thereof with herringbone pneumatic dynamic pressure generating grooves and annular grooves which is continuous to the both ends of said herringbone pneumatic dynamic pressure generating grooves.

Said annular grooves formed on the bearing surface of said stationary shaft may have a depth which is larger than that of said herringbone pneumatic dynamic pressure generating grooves.

Said annular grooves may extend beyond the edge of the radial bearing surface of said rotary shaft by ⅓ to ⅔ of its width outwardly in an axial direction.

Said stationary and rotary shafts may be made of ceramic material.

According to another aspect of the present invention, there is provided a high speed rotor assembly including:

a radial pneumatic dynamic pressure generating grooves, a stationary shaft which erects on and within a housing, and a rotary shaft surrounding said stationary shaft, which is rotatably borne on said housing; and a rotor secured to said rotary shaft, characterized in that said assembly comprises:

a magnetized portion provided along the outer peripheral side of said rotor; and a magnetic bearing having a ring-shaped magnet which is in the same plane as said magnetized portion for bearing said rotor in a radial and thrust directions so that a gap is formed in a radial direction between said rotor shaft and said stationary shaft and in that the gap between the magnetized portion provided along the outer periphery of said rotor is larger than that between said rotary and stationary shafts.

The gap between said magnetized portion and said ring-shaped magnet may be 0.05 to 5 mm and the gap between said stationary shaft and said rotary shafts is 1 to 30 $\mu$m.

Said magnetized portion may be formed on the outer peripheral side of said rotor and on a plane including the gravity center of said rotor and which is normal to the axis of said rotor.

Said stationary shaft of said radial pneumatic bearing may be formed on the bearing surface thereof with herringbone pneumatic dynamic pressure generating grooves.

Said stationary shaft of said radial pneumatic bearing may be formed at the ends of the bearing surface thereof with annular grooves.

Said bearing surfaces of said stationary and rotary shafts in said radial pneumatic bearing may be formed as smooth surfaces.

A term "high speed rotor assembly" used herein generally refer to motors having a dynamic pressure bearing mechanism.

When the rotor is stopped to be rotated by the magnetic bearing, the movement in an axial direction is restricted by the magnetic force so that the rotor is levitated in a given position in a thrust direction. As pneumatic dynamic pressure is generated in a gap between the stationary shaft and the rotary shaft by the herringbone grooves, the number of rotations of the rotor increases. The rotor will have an increased bearing rigidity and dumping characteristics in both radial and thrust directions against the external shock over a wide range of environments from an initial rotation to high speed rotation owing to the combined effect of the pneumatic dynamic pressure with the magnetic force of the ring-shaped magnets. The load bearing ability of the pneumatic dynamic pressure due to the herringbone grooves will become larger than that of the magnetic forces from the magnets as the number of the rotations of the rotor increases. This suppresses the whirl motion of the rotor (precession of the rotor) to provide a higher accuracy of rotation at a higher speed.

By forming the bearing surfaces of said stationary and rotary shafts into smooth surfaces in the radial pneumatic bearing, the radial pneumatic bearing can be manufactured at a low cost.

By forming the herringbone pneumatic dynamic pressure generating grooves on the bearing surface of the stationary shaft in the radial bearing, the stability can be enhanced.

The annular grooves at the ends of the herringbone grooves formed on the bearing surface of said stationary shaft which is continuous thereto and has a larger depth prevent the distribution of dynamic pressure which occurs at the ends of the rotor.

By making the stationary and rotary shafts of ceramic material, dead lock due to contact between stationary and rotary shafts made of metal, which otherwise occurs, can be prevented.

BRIEF DESCRIPTION OF THE DRAWINGS

FIG. 1 is a sectional view showing a high speed rotor assembly of a first embodiment of the present invention;

FIG. 7 is a table showing a result of simulation of the performance of the high speed rotor assembly of the second embodiment;

DETAILED DESCRIPTION OF THE INVENTION

Before the description of the presently preferred embodiments of the present invention, the principle of a pneumatic dynamic pressure bearing and whirl motion will be described.

Principle of the Penumatic Dynamic Pressure Bearing

Figure 2A:
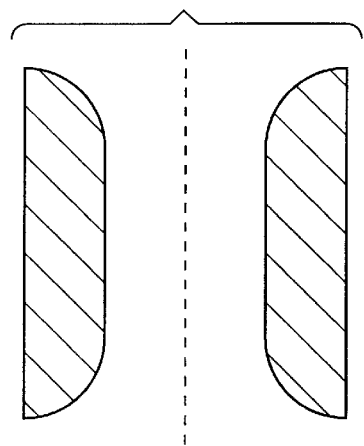
FIG. 2A and 2B is a schematic view for illustrating the shape of a rotary shaft of the present invention.
Figure 2B:
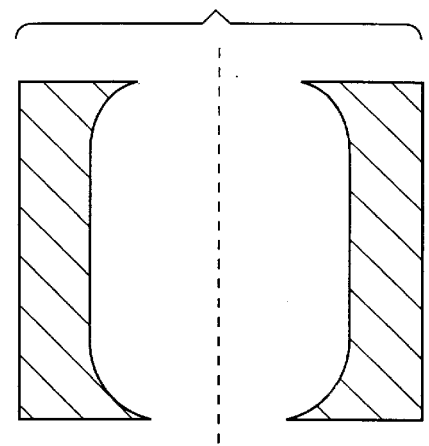
Figure 3A:
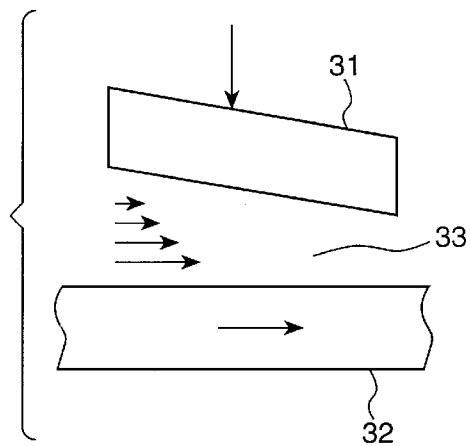
FIG. 3A and 3B is a schematic view for explaining the principle of a pneumatic dynamic pressure bearing.
Figure 3B:
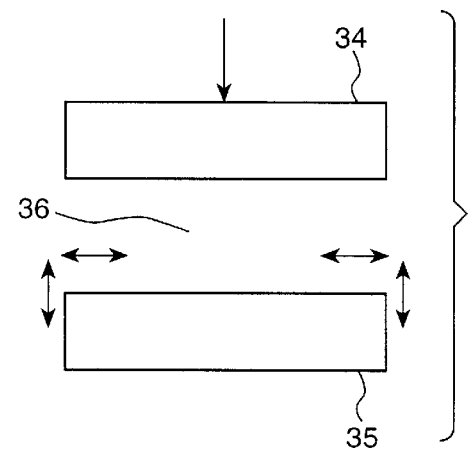

The pneumatic dynamic pressure bearing makes use of the characteristic which gas possesses as an viscous fluid. As shown in FIG. 3A and 3B, load bearing capability is obtained by two effects. A first effect which is shown in FIG. 3A is a dynamic pressure effect in which when a gas is entrained into a tapered gap 33 between opposite two surfaces 31 and 23 by the sliding movement thereof, a pressure of the gas is built up to bear a depressing force, that is, a load, so that a gas film is formed between the sliding surfaces. A second effect which is shown in FIG. 3B is caused when opposite two surface move toward each other at a given speed. At this time, the gas 36 between two surfaces 34 and 35 should be expelled at a rate which is proportional to the approaching speed of the two surfaces 34 and 35. This expelling of the gas causes the pressure of the gas to increase against the depressing forces of the two surfaces. This effect is a dynamic pressure effect due to non-steady gas film formation and is also referred to as squeeze effect.

Principle of Occurrence of Whirl Motion

Figure 4:
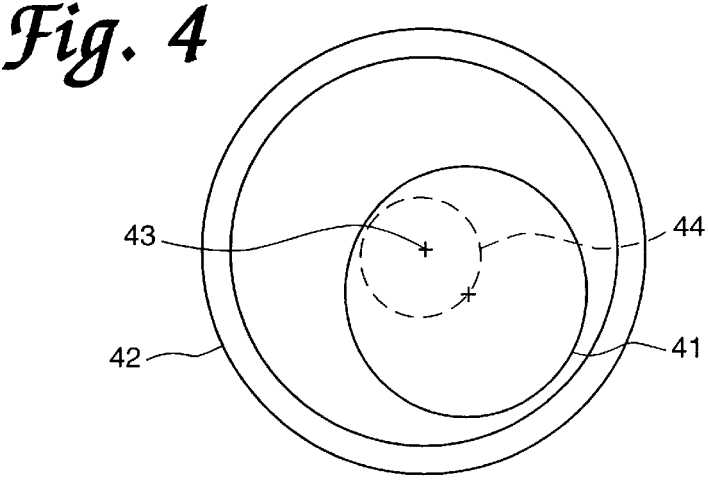
FIG. 4 is schematic view for explaining the whirl movement which occurs in the rotor assembly using the pneumatic dynamic pressure bearing.

FIG. 4 is a schematic view explaining the whirl motion of a radial bearing. For ease of explanation, a vertical axis is assumed and no effect of gravity is considered. If it is assumed that the center of a rotary shaft 41 which is rotating at an angular velocity ω is offset from the bearing center 43 by e, a pressure is generated in the gas lubricating film between a fixed bearing 42 and the rotary shaft 41 due to the above-mentioned dynamic pressure effect. A force Fe which serves to return the rotary shaft 41 to the original bearing center 43 is not only generated, but also a force F ω which causes precession of the rotary shaft 41 around the bearing center 43. When the rotary shaft 41 begins precession at an angular speed Ω, a pressure is generated due to the squeeze effect to cause a force F Ω which serves to suppress the precession of the shaft 41.

The centrifugal force acting on the rotor 41 is represented by $meΩ^2$ where in the mass m of the rotor 41 which is borne by the bearing. The rotor 41 will perform the precession at such an angular velocity Ω that $meΩ^2$ =Fe. If FΩ=Fω at this time, there is not force which accelerates or decelerates the precession. Accordingly, the steady precession of the rotor with a given radius 44 will continue. If FΩ<Fω, the precession is decelerated so that the centrifugal force will gradually decrease. If FΩ>Fω, the precession motion will be accelerated so that the centrifugal force will surpass the centripetal force and gradually increase. Therefore, in order to suppress the whirl motion from occurring, the centripetal force component Fe of the reaction of the gas film should be increased. It is necessary to decrease the influence of the dynamic pressure on the changing component of the reaction of the gas film without decreasing the squeeze effect. In the first embodiment of the present invention, the whirl motion is suppressed by increasing the centripetal component Fe of the reaction of the gas film by making the rotary shaft eccentric within a given range with a dynamic pressure caused by the herringbone shaped grooves and a magnetic force from a magnetic bearing.

Now, the first embodiment of the present invention will be described with reference to drawings. FIG. 1 shows the schematic sectional structure of a high speed rotor assembly having a polygon mirror of the first embodiment. A stationary shaft 12 made of a ceramic material is provided in the center of a housing 11 made of aluminum so that stationary shaft is provided on the housing. The ceramic stationary shaft 12 is formed with dynamic pressure generating grooves, or herringbone dynamic pressure generating grooves 15a, 15b, having a depth of 6 to 8 microns, which are inclined in opposite directions with respect to the axial direction so that a maximum pressure is generated in the center 14 of bearing surface of the ceramic rotary shaft 13. Annular grooves 16a and 16b having a depth of *10* microns are formed at the opposite ends of the herringbone dynamic pressure generating grooves 15a, 15b. The annular grooves 16a, 16b have a width of 2.0 mm and extend outwardly beyond the edge of the bearing surface of the rotary shaft 13 by one thirds of their width.

A ring-shaped magnet 23 is bonded on or secured to the inner side of the housing 11 so that it is coaxial with the ceramic stationary shaft 12. A flange 17 which is made of aluminum is secured to the outer periphery of the ceramic rotary shaft 13 by shrinkage fit. The aluminum flange 17 is formed with recesses on the lower and outer sides thereof. Ring-shaped magnets 18 and 19 are fitted on the recesses. A polygon mirror 20 is secured to the upper side of the aluminum flange 17 by means of adhesive or bolts. These components constitute a rotor 21.

The rotor 21 is fitted on the ceramic stationary shaft 12 so that a small gap or clearance 22 which is in the order of about 5 microns is formed between the inner side of the rotor 21 (rotary shaft 13) and the outer side of the stationary shaft 12 and a gap which is 1.5 mm is formed between the ring-shaped magnet 19 fitted on the outer side of the rotor 21 and the inner side of the housing 11. The rotor 21 is prevented from moving in an axial direction by the magnetic attracting forces of two ring-shaped magnets 19 and 23 and is levitated in a given position in a thrust direction. Two ring-shaped magnets 19 and 23 are positioned substantially coaxially with respect to the center of the bearing while the rotor 21 is eccentric relative to the center of the bearing by 2.5 μm (eccentricity =0.5) due to the fact that the magnetic balance is slightly different between the magnets 19 and 23. Accordingly, a large dynamic pressure can be generated even at not higher than 10000 r.p.m. and shock resistance can be enhanced.

It is preferable that the gaps 24 and 22 between the magnetized portion along the outer side of the rotor and the ring-shaped magnet and between the rotor and the ceramic bearing be 0.05 to 0.5 mm and 1 to 30 μm, respectively.

If the gap 24 is not larger than 0.05 mm, the magnetic attracting force exceeds the radial load bearing capability.

If the gap 24 exceeds 5 mm, the rotor can not be borne in a thrust direction and the centrifugal force becomes smaller. Accordingly, if the gap is not within this range, it is hard to obtain the eccentricity of 0.3 to 0.7 on rotation at a high speed.

If the gap 22 is not larger than 1 μm, the load bearing ability becomes too high, resulting in unstable rotation.

The friction loss on steady rotation is high and the power consumption becomes high. The amount of generated heat becomes high so that various functions including rotation stability and damage due to contact occur by the changes: in dimension of mechanical parts due to thermal expansion.

If the gap 22 is larger than 30 μm, the load bearing ability is lowered, resulting also in a less rotation stability.

By adjusting the gaps 22 and 24 so that they fall within these ranges, the eccentricity can be stably kept to 0.3 to 0.7 on high speed rotation by the combination of pneumatic bearing and magnetic bearing.

In the present invention, it is preferable that the magnetized portion be formed on the outer peripheral side of the rotor and on a plane including the gravity of the rotor, which is normal to the axis of the rotor.

This is the reason why the conical vibrations can be suppressed by the existence of the magnetized portion on the plane including the gravity center.

The rotor 21 is rotated by means of a motor comprising a coil 25 secured to the housing 11 and a magnet 18 secured to the aluminum flange 17 and a rotation control unit (not shown).

The rotor 21 is started to rotate by the motor. As the number of rotations of the rotor 21 increases, a pressure is generated in the bearing gap 22 by the herringbone pneumatic dynamic pressure generating grooves 15a, 15b so that the radial load bearing ability is obtained. The increase in the radial load bearing ability enhances the shock resistance of the bearing and suppresses the whirl motion of the rotor 21 so that the radius of the whirl motion becomes small to provide increased precision of the rotation.

In other words, a pneumatic dynamic pressure is generated in a gap between the stationary shaft 12 and the rotary shaft 13 by the herringbone grooves 15a, 15b as the number of rotations of the rotor 21 increases. The rotor 21 will have an increased bearing rigidity and dumping characteristics in both radial and thrust directions against the external shock over a wide range of environments from an initial rotation to high speed rotation due to the combined effect of the pneumatic dynamic pressure with the magnetic force of the ring-shaped magnets 19, 23. The load bearing ability of the pneumatic dynamic pressure due to the herringbone grooves 15a and 15b will become larger than that of the magnetic forces from the magnets 19 and 23 as the number of the rotations of the rotor 21 increases. This suppresses the whirl motion of the rotor to provide a higher accuracy of rotation at a higher speed.

Unstable dynamic pressure distribution which occurs at the both ends of the rotary shaft 13 is suppressed, and contact between both ends of the rotary shaft 13 and the stationary shaft 12 is prevented from occurring due to the fact that the annular grooves 16a, 16b, which are continuous with the herringbone grooves 15a, 15b, has a larger depth than that of the herringbone grooves 15a, 15b and that and extend outwardly beyond the edge of surface of the radial bearing of the rotary shaft 13 by one thirds of its width. It is considered that the unstable dynamic pressure distribution can be suppressed by the fact that the annular grooves 16a, 16b are offset outwardly by ⅓ to ⅔ of their width relative to the edge of the radial bearing surface of the rotary shaft 13.

By making the stationary and rotary shafts of ceramic material, dead lock due to contact between stationary and rotary shafts made of metal which otherwise occurs can be prevented.

In the above-mentioned first embodiment of the high speed rotor assembly, the rotor 21 is eccentric with respect to the center of the bearing at 0.5 by the difference in magnetic balance between the ring-shaped magnets 19 and 23 as mentioned above. By making the rotary shaft 13 eccentric, a higher dynamic pressure is generated to enhance the accuracy of the rotation. It is found from the result of simulation that enhancement in the precision of the rotation due to the eccentricity of the rotor 21 provides a remarkable result when the eccentricity is not less than 0.3 on steady rotation. On the other hand, when the eccentricity is 0.7 or higher, the risk of contact between the stationary shaft 12 and the rotary shaft 13 occurs on application of a external force such as shock, etc. Therefore, the eccentricity is preferably 0.3 to 0.7.

Figures 5, 6:
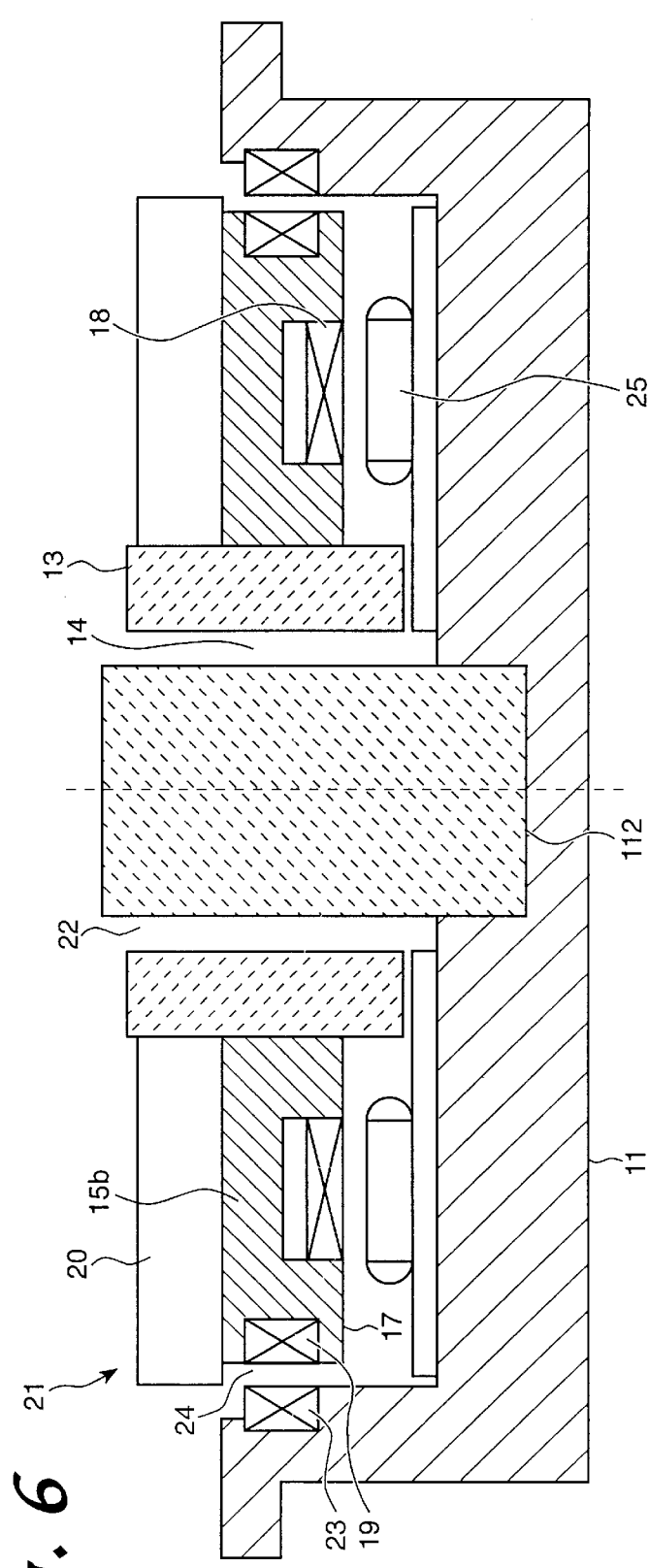
FIG. 5 is a table showing a result of a simulation in which the performance of the prior art is compared with a high speed rotor assembly of the present invention.
FIG. 6 is a sectional view showing a high speed rotor assembly of a second embodiment of the present invention.
Figure 8:
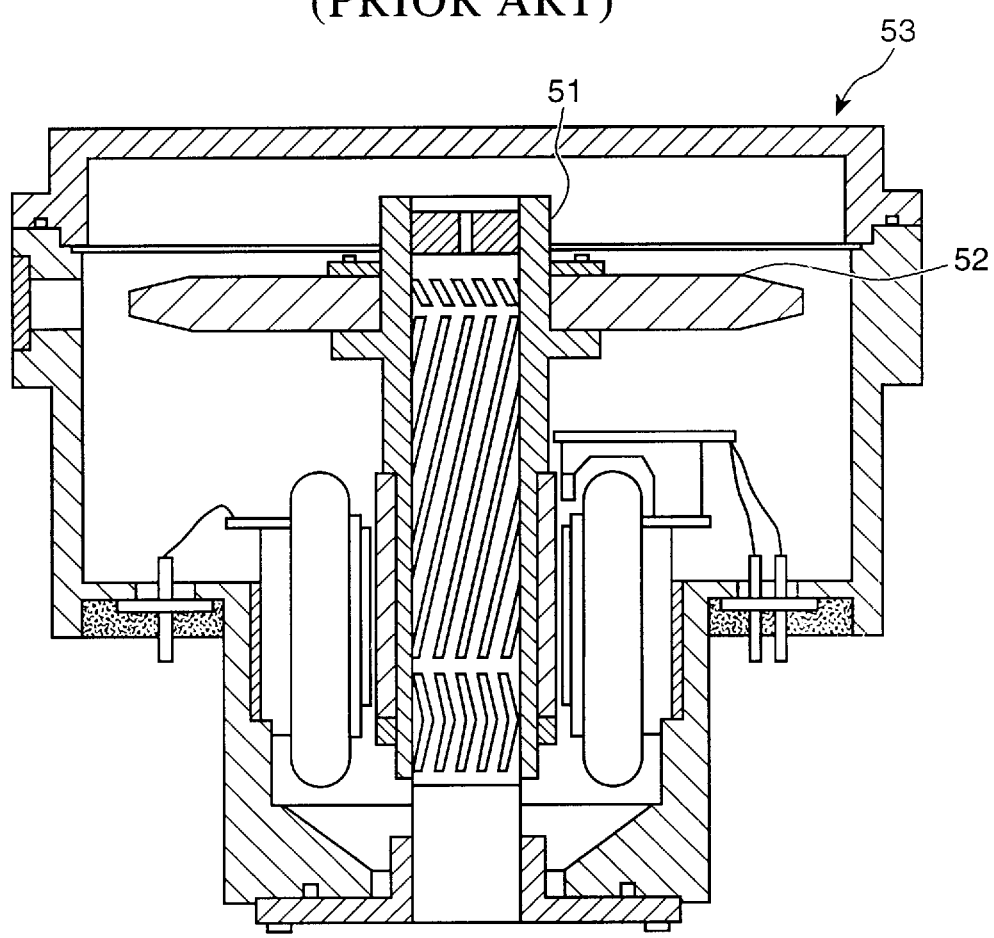
FIG. 8 is a sectional view of a high speed rotor assembly for illustrating the prior art.
Figure 9:
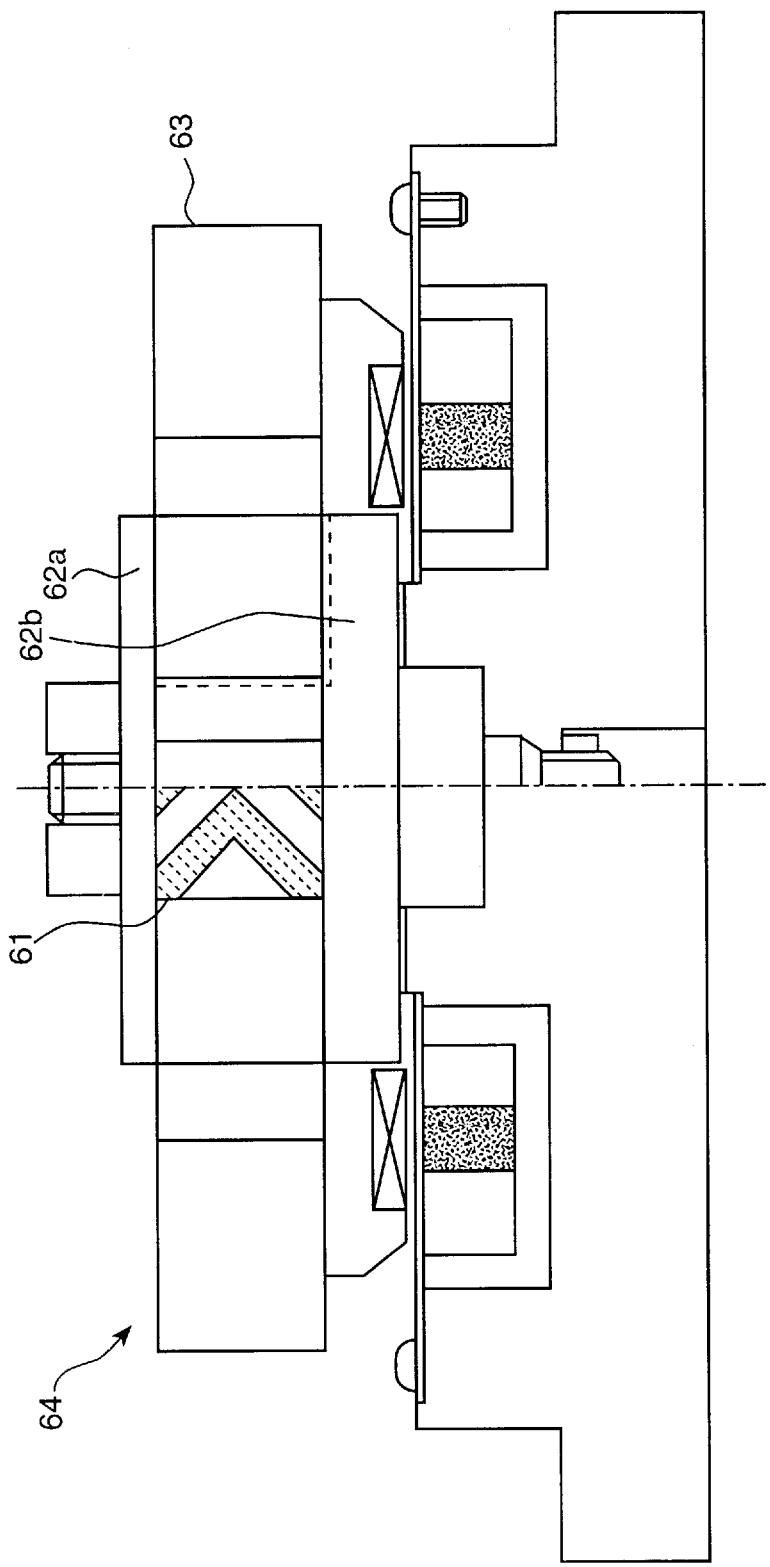
Fig. 9 is a sectional view of a high speed rotor assembly on which a miniaturized polygon mirror is mounted for illustrating the prior art.

The results of comparison between the prior art shown in FIG. 9 and the simulation of the precision of rotation of the high speed polygon formed as mentioned above is rotated at 30000 r.p.m. is shown in FIG. 5.

In the high speed rotor assembly of the first embodiment, the rotor 21 is levitated in an axial direction by the attracting forces of the ring-shaped magnets 19 and 23 as mentioned above. Therefore, the friction loss which occurs before levitation is eliminated so that the rise-up time until steady rotation is shorter and less starting torque is necessary.

Particularly, in the first embodiment, a higher dynamic pressure can be generated since the rotor 21 is eccentric relative to the center of the bearing by the difference in magnetic balance between the magnets 19 and 23. A higher dynamic pressure can also be generated by the herringbone pneumatic dynamic pressure generating grooves 15a, 15b. It is deemed that these effects combine to generate very high load bearing ability and to enhance the shock resistance of the bearing. It is further considered that the whirl motion of the rotor 21 is suppressed so that the radius of the whirl motion becomes small to enhance the accuracy of the rotation.

It is considered that the mechanism of thrust dynamic pressure bearing is not necessary to reduce the power consumption since the rotor 21 is levitated in an axial direction by the above-mentioned magnets 19 and 23. It is understood from FIG. 5 that the high speed rotor assembly of the first embodiment has very excellent rotation characteristics.

Now, a high speed rotor assembly of the second embodiment of the present invention will be described with reference to FIG. 6. Parts which are substantially identical with those of the first embodiment are denoted by like reference numerals and description thereof is omitted.

In the second embodiment, the stationary shaft 112 of ceramic material is not provided on the surface thereof with herringbone pneumatic dynamic pressure generating grooves 15a, 15b, but its surface is smoothed. Similarly with the first embodiment, the rotor 21 is eccentric relative to the center of the bearing by 2.5 $\mu$m (eccentricity =0.5) by the difference in magnetic balance between the ring-shaped magnets 19 and 23.

In other words, by making the rotary shaft 13 eccentric, a high dynamic pressure is generated to prevent the rotor 21 from performing the whirl motion to provide a high precision of rotation.

The result of simulation of the performance of the high speed rotor assembly of the second embodiment will be described with reference to FIG. 7. FIG. 7 shows the bearing number, stability characteristics, stability limit weight (kg) for the radial clearances of 0.0020, 0.0025, 00030 (mm) when the number of rotations is set to 8000 (r.p.m.) and the eccentricity is 0.1 to 0.8. It is found from the simulation result that a high stability limit weight can be obtained by making the eccentricity 0.3 or more. On the other hand, there occurs the risk of contact between the stationary shaft 12 and the rotary shaft 13 due to shocks, etc., similarly with the above-mentioned first embodiment when the eccentricity is 0.7 or more. Accordingly, it is preferable that the eccentricity be 0.3 to 0.7.

The second embodiment has an advantage in that a high speed rotary polygon mirror can be provided at a low cost by omitting the herringbone pneumatic dynamic pressure grooves 15a, 15b which are difficult to be provided on the surface of the stationary shaft 112 of the ceramic material.

As mentioned above, the high speed rotor assembly of the present invention can be used for a bearing for a polygon mirror used in the laser printer, bar code readers, facsimiles and laser copy machines. The rotor is also suitable for recording apparatus, machine tools, measuring instruments in which a member which is rotating at a high speed is borne by a thrust pneumatic dynamic pressure bearing.

What is claimed is:

1. A high speed rotor assembly comprising:
   a radial pneumatic dynamic pressure bearing which includes a housing, a stationary shaft provided on and within said housing, and a rotary shaft surrounding said stationary shaft, said rotary shaft being rotatably borne; and
   a magnetic bearing which includes a rotor secured to said rotary shaft and provided along its outer peripheral side with a magnetized portion, and a ring-shaped magnet secured to said housing positioned in the same plane as said magnetized portion for bearing said rotor in radial and thrust directions so that a gap is formed between said rotary and stationary shafts in a radial direction,
   wherein the radial load of said rotor is borne by the combination of the load bearing ability of said radial pneumatic dynamic pressure bearing and the radial load bearing ability of said magnetic bearing, and said rotor is borne at an eccentricity of 0.3 to 0.7.

2. A high speed rotor assembly as defined in claim 1 in which the load bearing ability of said radial pneumatic dynamic pressure bearing for bearing said rotor is larger than the radial load bearing ability of said magnetic bearing in a range of applicable numbers of rotations of said rotor.

3. A high speed rotor assembly as defined in claim 1 or 2 in which the bearing surfaces of said stationary and rotary shafts in said radial pneumatic bearing are formed into smooth surfaces.

4. A high speed rotor assembly as defined in claim 1 or 2 wherein said stationary shaft of said radial pneumatic bearing is formed on the bearing surface thereof with herringbone pneumatic dynamic pressure generating grooves and annular grooves, said annular grooves being formed at opposite ends of said herringbone pneumatic dynamic pressure generating grooves.

5. A high speed rotor assembly as defined in claim 4 in which said annular grooves formed on the bearing surface of said stationary shaft have a depth which is greater than that of said herringbone pneumatic dynamic pressure generating grooves.

6. A high speed rotor assembly as claim 5 in which said annular grooves extend beyond the edge of the radial bearing surface of said rotary shaft by ⅓ to ⅔ of its width outwardly in an axial direction.

7. A high speed rotor assembly as defined in claim 4 in which said annular grooves extend beyond the edge of the radial bearing surface of said rotary shaft by ⅓ to ⅔ of its width outwardly in an axial direction.

8. A high speed rotor assembly as defined in claim 1 in which said stationary and rotary shafts are made of ceramic material.

9. A high speed rotor assembly comprising:
   a radial pneumatic dynamic pressure bearing which includes a housing,
   a stationary shaft provided on and within said housing, and
   a rotary shaft surrounding said stationary shaft, said rotary shaft being rotatably borne; and
   a magnetic bearing which includes a rotor secured to said rotary shaft and provided along its outer peripheral side with a magnetized portion, and a ring-shaped magnet secured to said housing positioned in the same plane as said magnetized portion for bearing said rotor in radial and thrust directions so that a gap is formed between said rotary and stationary shafts in a radial direction,
   wherein the gap between said magnetized portion and said ring-shaped magnet is 0.05 to 5 mm and the gap between said stationary shaft and said rotary shaft is 1 to 30 $\mu$m.

10. A high speed rotor assembly as defined in claim 9 wherein said magnetized portion is formed on a plane which includes the center of gravity of said rotor, said plane being normal to the axis of said rotor.

11. A high speed rotor assembly as defined in claim 9 in which said stationary shaft of said radial pneumatic bearing is formed on the bearing surface thereof with herringbone pneumatic dynamic pressure generating grooves.

12. A high speed rotor assembly as defined in claim 9 in which said stationary shaft of said radial pneumatic bearing is formed at the ends of the bearing surface thereof with annular grooves.

13. A high speed rotor assembly as defined in claim 9 in which the bearing surfaces of said stationary and rotary shafts in said radial pneumatic bearing are formed into smooth surfaces.

* * * * *